March 5, 1946.  W. G. MITCHELL  2,395,896
PINKING SHEARS
Filed Nov. 5, 1942  2 Sheets-Sheet 1
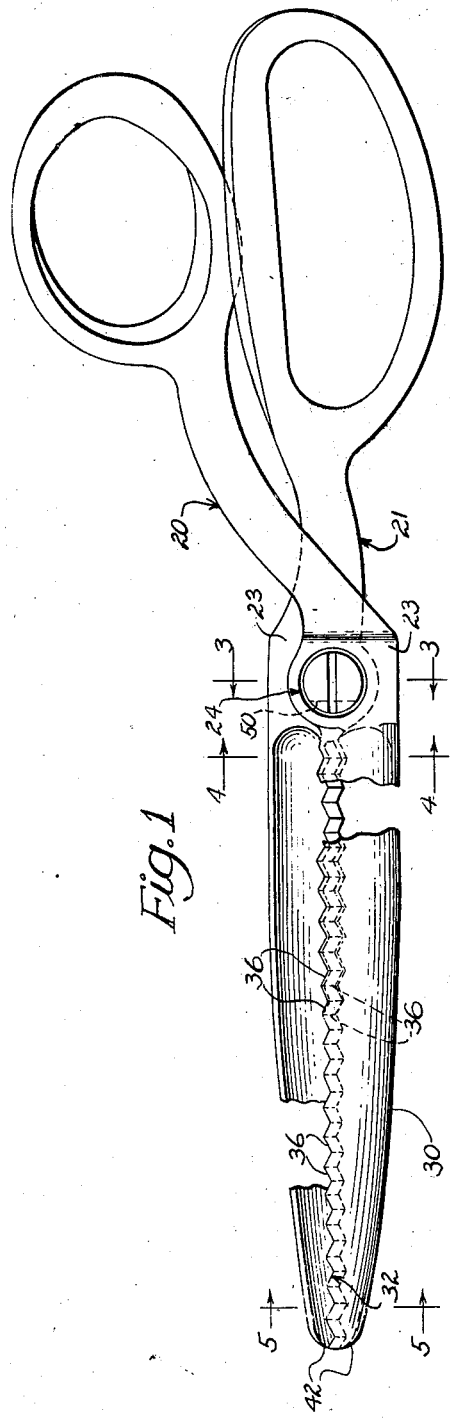
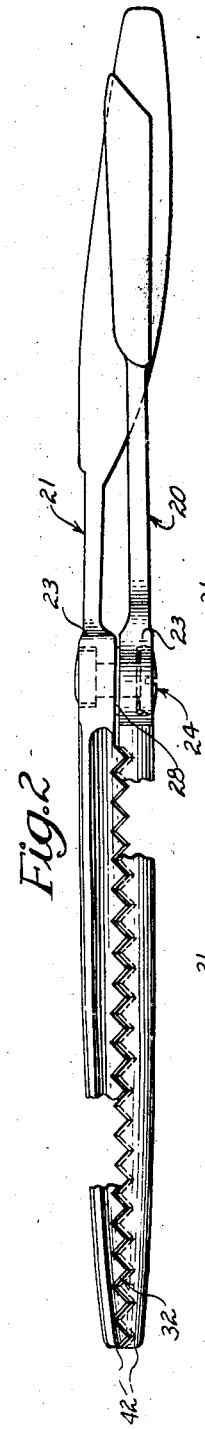
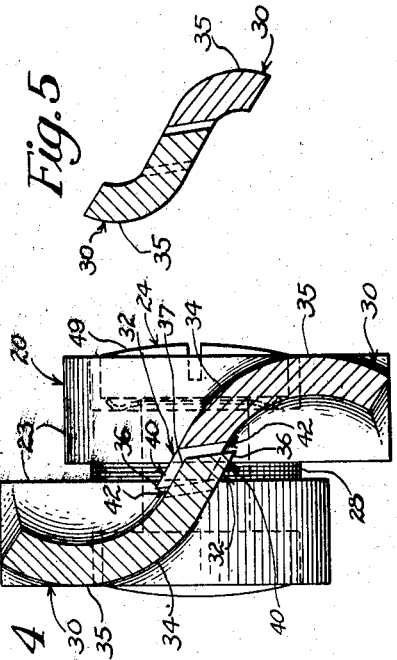
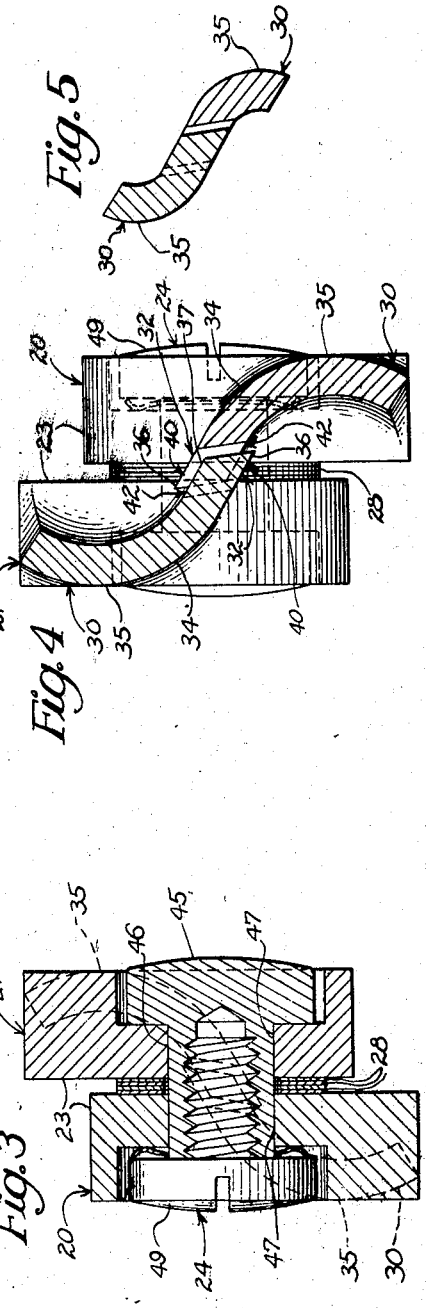
Inventor
Walter G. Mitchell
by:
Louis Sheldon
Attorney March 5, 1946. W. G. MITCHELL 2,395,896
PINKING SHEARS
Filed Nov. 5, 1942 2 Sheets-Sheet 2
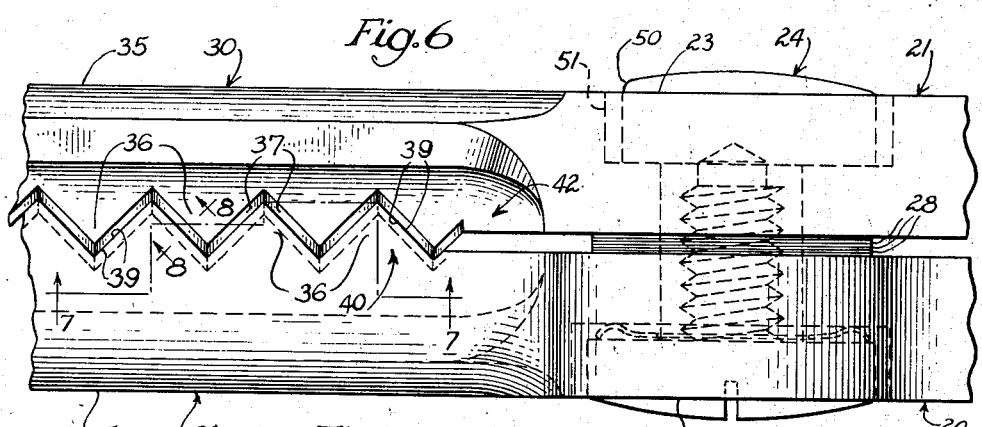
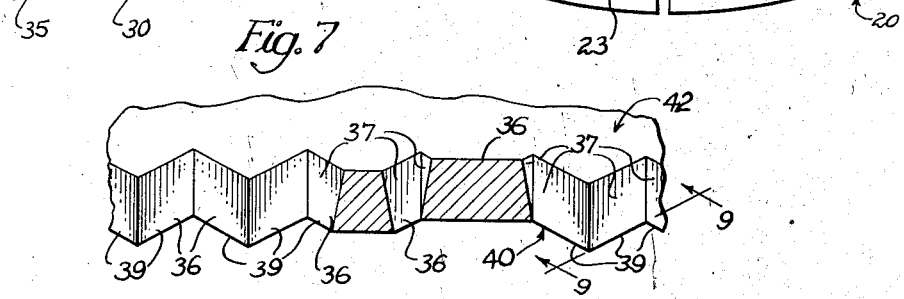
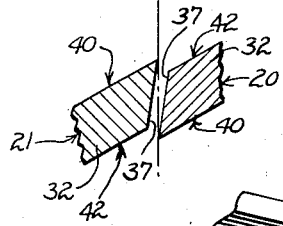
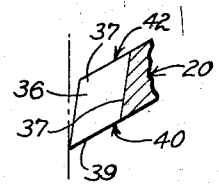
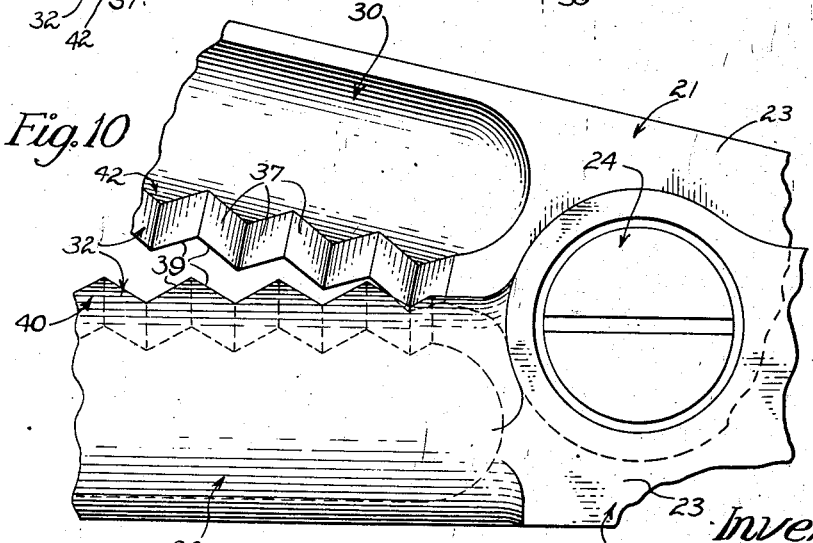
Inventor
Walter G. Mitchell
by:
Louis Sheldon
Attorney Patented Mar. 5, 1946

2,395,896

UNITED STATES PATENT OFFICE 2,395,896

PINKING SHEARS

Walter G. Mitchell, Aurora, Ill., assignor to Sears, Roebuck and Co., Chicago, Ill., a corporation of New York Application November 5, 1942, Serial No. 464,679

13 Claims. (Cl. 30—230)

This invention has to do with pinking appliances such as pinking shears.

Conventional devices of this type, especially those used in dressmaking, are unsatisfactory for the reasons, among others, that they are too heavy; the cloth spreads the blades apart, tending to weaken the pivot and render the cutting inaccurate and dulling the teeth; and the nearest point relative to the pivot, at which cutting can commence, is unnecessarily remote from the pivot, requiring unduly long blades for a given length of cut.

It is accordingly an object of my invention to provide a pinking shears in which the above-noted, among other, disadvantages are obviated.

A further object is to provide a pinking shears which is self-adjusting and self-sharpening.

Another object is to provide a pinking shears combining enhanced appearance and strength.

Further objects and advantages of the invention will appear as the description proceeds.

The invention will be better understood upon reference to the following description and the accompanying drawings, in which—

Fig. 1 is a side elevation of a pinking shears embodying features of my invention.

Fig. 2 is a plan view looking down on Fig. 1.

Fig. 3 is an enlarged view, partly in section and partly in elevation, taken as indicated by the line 3—3 in Fig. 1.

Fig. 4 is a sectional view taken as indicated by the line 4—4 in Fig. 1.

Fig. 5 is a sectional view taken as indicated by the line 5—5 in Fig. 1.

Fig. 6 is an enlargement of a portion of Fig. 2.

Fig. 7 is a fragmentary sectional view showing the teeth of one of the blades, partly in section and partly in elevation, taken as indicated by the line 7—7 in Fig. 6.

Fig. 8 is a fragmentary sectional view taken as indicated by the line 8—8 in Fig. 6.

Fig. 9 is a fragmentary sectional elevation taken as indicated by the line 9—9 in Fig. 7.

Fig. 10 is a view similar to Fig. 1, but with the blades in a different relation.

An illustrative pinking shears embodying features of my invention comprises complemental thumb and finger blade members 20 and 21 having intermediate hub portions 23 pivotally connected together at 24, said portions being adjustably spaced apart as by shims 28. Extending outwardly from the hub portions are blades 30, each preferably being of concavo-convex substantially arcuate cross-section, permitting the use of relatively thin gage steel affording adequate strength and giving an attractive and unusual appearance, and having a marginal serrated shearing portion 32 which may be transversely curved or substantially flat if desired.

The arrangement is such that in cross-section the blades when closed simulate an S, the serrated edges being intermeshed at the mid-portion of the S. The convex faces 34 of the blades are preferably at the outer sides of the shears, with the intermediate portions 35 of said faces laterally outermost.

The teeth 36 are identical for both blades, each set of teeth being formed by a broaching, milling, grinding or any other suitable operation, each tooth wall 37 accordingly being flat. The cutting edge 39 of each tooth wall 37 is at the juncture of such wall with the outer or shearing surface 40 of the marginal cutting portions 32. The tooth wall 37 recedes at an inclination of substantially 10° from a plane of movement of the blade, such as is represented by the line 41 laterally in a direction away from the opposite blade and toward the inner surface 42 of the serrated portion 32. The inclination may be greater or less than 10°, but in any event is sufficient to afford the necessary clearance in view of the fact that the teeth have arcuate movement about the pivot 24 so that each cutting edge 39 will clear the entire or a sufficient portion of the juxtaposed wall 37 of the complemental opposite blade tooth sufficiently to preclude binding or wedging of the pinked cloth or other material between juxtaposed tooth walls.

In conventional pinking shears, the planes of the cutting edges are normal to the direction of cutting motion of the blade, and the material as it is being engaged by the cutting edges tends to wedge or pry the blades laterally apart, since the blades are least resistant to such movement thereof. This action weakens the pivot and promotes permanent springing apart of the blades and accordingly requires frequent adjustment. In accordance with the invention, I overcome these disadvantages by inclining the shearing surface 40 of each blade to the direction of relative movement of the blades and in such an arrangement that such surface on the right blade faces to the right and such surface on the left blade faces to the left. The material being cut tends to wedge or pry apart the blades, but the blades are most readily yieldable in directions substantially normal to the shearing surfaces 40 and the components of the wedging or prying force are such that the teeth actually are urged closer together, thereby causing them to effect a cleaner cutting of the material and promoting the close cooperation of the teeth which is conducive to self-sharpening and optimum cutting results and substantially reduces the necessity for readjustment at the pivot. The inclination of the shearing portions 32 is selected for maximum strength of the teeth and blades as a whole with minimum thickness of material. An angle of substantially 60° to the plane of blade movement may be used. Greater or smaller angles of inclination may be employed, however, affording more or less optimum results, without departing from the spirit of my invention.

In conventional pinking shears of the type under consideration, the teeth are arranged in series or rows non-radial to the pivot. Such construction requires the rearmost teeth to be spaced considerably forward of the pivot in order that the angle between the rows of teeth when such rearmost teeth meet may be small enough to insure the proper cutting of the material. This space is occupied by metal which is not only expensive but is an added weight in a tool which at best is rather heavy, especially for women. This metal must be quite heavy for strength because of the additional torque burden placed on the pivot and on the blades by reason of the added overall length of the blades forward from the pivot for a given cutting length, said added length lessening the resistance to springing apart. As seen in Fig. 10, with my construction, the rearmost teeth are immediately adjacent the pivot and when said rearmost teeth are in cutting positions, the rows of teeth are at a proper cutting angle, thereby eliminating a substantial quantity of expensive and heavy metal, and also eliminating the need for an unduly strong pivot and permitting the use of shorter blades for the same length of cut or enabling a longer cut to be made with blades of the same length as conventional blades, and permitting the use of blades longer than conventional blades and of relatively thin gage metal which further reduces the weight of the device. The rows of teeth recede somewhat toward the free ends 42 thereof so that the end teeth may be angularly related as they meet to properly cut the cloth or other material. Accordingly, the overlap of the teeth will be greater near the pivot, as shown in Fig. 4, than at the ends 42, as shown in Fig. 5, when the shears is closed.

The cross-sectional shape and arrangement of the cutting portions of the blades are desirable moreover because of the strength afforded thereby in all directions and the lightness of weight which makes this shears substantially lighter than prior pinking shears of commensurate strength, enabling my shears to be used with a minimum of fatigue.

Shears embodying my invention may be made from any suitable metal such as tool steel employed in pinking shears of conventional design.

The pivot 24 may be of any suitable construction, such, for example, as a bushing 45 casehardened or otherwise hardened at 46 for bearing engagement with the hardened surfaces of the bores 47 of the blades, a screw 49 being threaded into the bushing. The bushing may have a head with a flat side 50 fitting in a similarly shaped recess 51 to prevent relative turning.

Various modifications may suggest themselves to those skilled in the art without departing from the spirit of my invention and, hence, I do not wish to be restricted to the specific form shown or uses mentioned, except to the extent indicated in the appended claims.

I claim:

1. A pinking tool comprising pivotally connected right and left blades each having a serrated cutting edge defining a shearing surface inclined to a plane normal to the pivot axis, said surface on the right blade facing to the right and said surface on the left blade facing to the left.

2. A pinking shears comprising pivotally connected thumb and finger blades having serrated cutting edges each comprising teeth arranged in a row extending substantially radially from the pivot, each of said edges defining a shearing surface inclined to a plane normal to the pivot axis and facing away from the other blade, said edges extending from points immediately forward of the pivot.

3. A pinking tool comprising a pair of blades having cutting portions of uniform thickness and arcuate in cross-section and arranged so that when said blades are closed, the composite cross-section of said portions is S-shaped, the adjacent portions of the blades in such closed position being serrated forming interengaging teeth presenting serrated cutting edges each cutting edge defining an inclined surface facing away from the other blade.

4. In a pinking tool, a pair of serrated blades each having a plurality of cutting teeth, each tooth having flat side walls and a shearing surface forming an acute angle with the intersection of said side walls thus providing a sharp serrated cutting edge, said side walls of each tooth extending convergently from said cutting edge to provide clearance angles for the proper intermeshing thereof with similar teeth on the other blade.

5. In a pinking tool, a pair of serrated blades having interengageable cutting teeth, each tooth of one blade having flat side walls and a shearing surface forming an acute angle with the intersection of said side walls to provide a sharp serrated cutting edge, said side walls of each tooth extending convergently from said cutting edge to provide clearance as the serrated edge of one blade passes the serrated edge of the other in the cutting movement.

6. A pinking tool comprising cooperating blades relatively movable in parallel planes, each blade having a serrated edge defining a shearing surface inclined to said planes and facing away from the other blade.

7. A pinking shears comprising pivotally connected blades, each having a serrated cutting edge comprising teeth arranged in a row extending substantially radially relative to the pivot, each of said edges defining a shearing surface which is inclined to a plane normal to the pivot axis and faces away from the other blade.

8. A pinking shears comprising pivotally connected thumb and finger blades each having a serrated cutting edge defining a shearing surface inclined to a plane normal to the pivot axis and facing away from the other blade, said cutting edges extending from points immediately forward of the pivot.

9. A pinking shears comprising pivotally connected blades having serrated cutting edges each comprising teeth arranged in a row extending substantially radially relative to the pivot, each of said edges defining a shearing surface inclined to a plane normal to the pivot axis and facing away from the other blade, said cutting edges extending from points immediately forward of the pivot and being arranged to extend at an angle to each other suitable for cutting when said points meet.

10. A pinking tool comprising a pair of blades relatively movable in parallel planes, said blades having serrated cutting portions, said blades being arcuate in cross-section and arranged so that, when said blades are closed, the composite cross-section of said blades through said portions is substantially S-shaped, each of said portions having a cutting surface inclined to said planes and facing away from the other blade.

11. In a pinking tool, a pair of pivotally connected serrated blades each having a plurality of cutting teeth, each tooth having flat side walls and a shearing surface forming an acute angle with the intersection of said side walls, thus providing a sharp serrated cutting edge, said side walls of each tooth extending convergently from said cutting edge to provide clearance angles for the proper intermeshing thereof with similar teeth on the other blade.

12. In a pinking tool, a pair of serrated blades having interengageable cutting teeth, each tooth of each blade having flat side walls and a shearing surface forming an acute angle with the intersection of said side walls to provide a sharp serrated cutting edge, said side walls of each tooth extending convergently from said cutting edge to provide clearance as the serrated edge of one blade passes the serrated edge of the other in the cutting movement.

13. A pinking tool comprising a pair of pivotally connected blades relatively movable in parallel planes, said blades having serrated cutting portions, said blades being arcuate in cross-section and arranged so that, when said blades are closed, the composite cross-section of said blades through said portions is substantially S-shaped, each of said portions having a cutting surface inclined to said planes and facing away from the other blade.

WALTER G. MITCHELL.